(12) United States Patent
Mason

(10) Patent No.: US 10,378,176 B2
(45) Date of Patent: Aug. 13, 2019

(54) JOYSTICK CONTROLLED SCRAPER BLADE ASSEMBLY

(71) Applicant: Johnnie Leroy Mason, Dashwood (CA)

(72) Inventor: Johnnie Leroy Mason, Dashwood (CA)

(*) Notice: Subject to any disclaimer, the term of this patent is extended or adjusted under 35 U.S.C. 154(b) by 88 days.

(21) Appl. No.: 15/361,058

(22) Filed: Nov. 24, 2016

(65) Prior Publication Data

US 2017/0145655 A1    May 25, 2017

Related U.S. Application Data

(60) Provisional application No. 62/259,809, filed on Nov. 25, 2015.

(51) Int. Cl.
| | |
|---|---|
| *E02F 3/84* | (2006.01) |
| *A01B 59/06* | (2006.01) |
| *E02F 3/815* | (2006.01) |
| *E02F 9/00* | (2006.01) |
| *E02F 9/20* | (2006.01) |
| *E02F 9/22* | (2006.01) |
| *E02F 3/76* | (2006.01) |

(52) U.S. Cl.
CPC ............ *E02F 3/844* (2013.01); *A01B 59/064* (2013.01); *E02F 3/7618* (2013.01); *E02F 3/815* (2013.01); *E02F 3/847* (2013.01); *E02F 9/006* (2013.01); *E02F 9/2004* (2013.01); *E02F 9/2271* (2013.01)

(58) Field of Classification Search
CPC ..... E02F 3/7622; E02F 3/7627; E02F 3/7631; E02F 3/844; E02F 3/7636–7659
See application file for complete search history.

(56) References Cited

U.S. PATENT DOCUMENTS

| | | | | |
|---|---|---|---|---|
| 4,071,090 A | * | 1/1978 | Easterling | ............... E02F 3/765 |
| | | | | 172/788 |
| 4,213,507 A | * | 7/1980 | Horrer | .................. E02F 3/7604 |
| | | | | 172/784 |
| 4,222,442 A | * | 9/1980 | Westendorf | ............. E02F 3/627 |
| | | | | 172/273 |
| 4,279,312 A | * | 7/1981 | Pyle | ...................... E02F 9/0841 |
| | | | | 172/292 |
| 4,304,307 A | | 12/1981 | Anderson | |

(Continued)

*Primary Examiner* — Matthew Troutman
(74) *Attorney, Agent, or Firm* — Brunet & Co. Ltd.

(57) ABSTRACT

A scraper blade assembly for a vehicle such as a tractor or skid-steer vehicle has a frame having a socket with a pivotable ball for connection to the vehicle. The pivotable ball permits pivoting movement of the frame about a longitudinal axis, a transverse axis and a vertical axis of the vehicle. Tilt of a scraper blade mounted on the frame is controlled by left and right hydraulic cylinders and angle of the scraper blade is controlled by a third hydraulic cylinder. A control system has a single joystick which is capable actuating the left and right hydraulic cylinders independently or simultaneously. The combination of the pivotable ball mount to permit three degrees of freedom of movement of the frame and the ability of a single joystick to independently or simultaneously control the left and right hydraulic cylinders results in smooth and accurate blade placement for finer control over earth moving operations.

17 Claims, 8 Drawing Sheets

(56) References Cited

U.S. PATENT DOCUMENTS

| | | | |
|---|---|---|---|
| 4,516,639 A * | 5/1985 | Hammarlund | A01B 43/00 172/122 |
| 4,635,730 A * | 1/1987 | Larsson | E02F 3/627 172/247 |
| 5,529,131 A | 6/1996 | Van Ornum | |
| 6,152,239 A * | 11/2000 | Kelley | E02F 3/841 172/4.5 |
| 6,283,225 B1 | 9/2001 | Hermonson | |
| 6,827,155 B1 * | 12/2004 | Hoffart | A01B 59/044 172/821 |
| 6,840,334 B2 | 1/2005 | Marquardt | |
| 7,021,398 B1 | 4/2006 | Marshall | |
| 7,334,658 B2 * | 2/2008 | Berg | B62D 1/12 180/333 |
| 7,497,298 B2 | 3/2009 | Shearer et al. | |
| 8,078,297 B2 | 12/2011 | Lasher et al. | |
| 8,167,080 B2 | 5/2012 | Ruhter et al. | |
| 8,291,999 B2 | 10/2012 | Howson et al. | |
| 8,360,165 B2 * | 1/2013 | Leith | A01B 59/06 172/821 |
| 8,473,166 B2 | 6/2013 | Zhdanov et al. | |
| 8,700,271 B2 | 4/2014 | Evenson et al. | |
| 8,893,818 B2 | 11/2014 | Hand et al. | |
| 8,924,098 B2 | 12/2014 | Zhdanov et al. | |
| 9,004,218 B2 | 4/2015 | Gulati et al. | |
| 10,036,139 B2 * | 7/2018 | French | E02F 3/844 |
| 2012/0181052 A1 * | 7/2012 | Laudenklos | A01B 59/064 172/813 |

\* cited by examiner

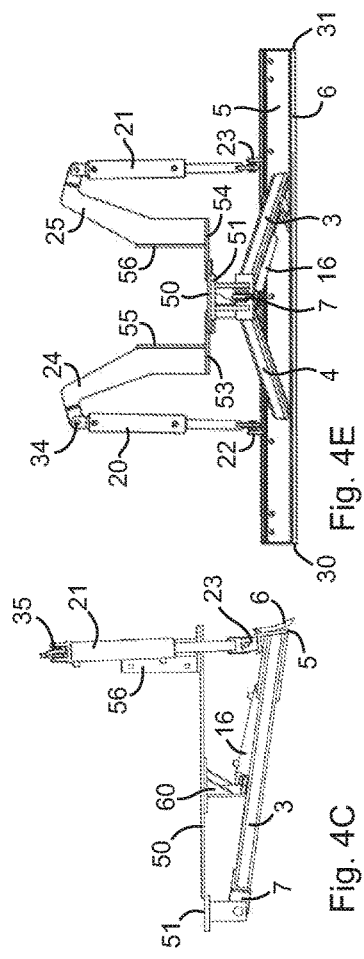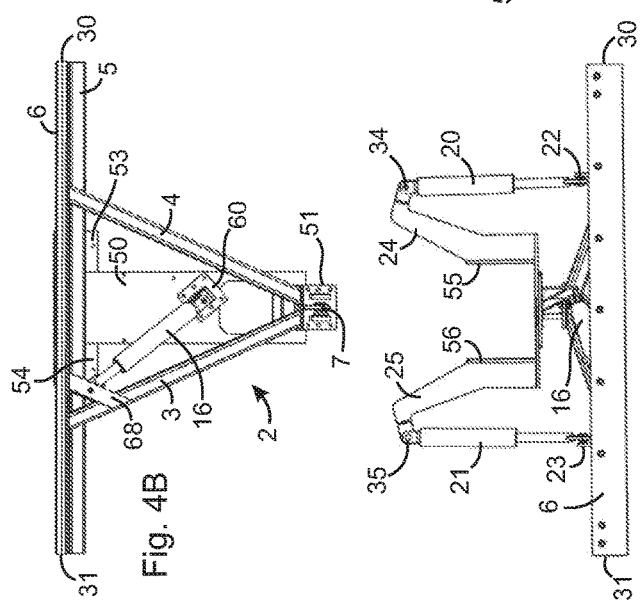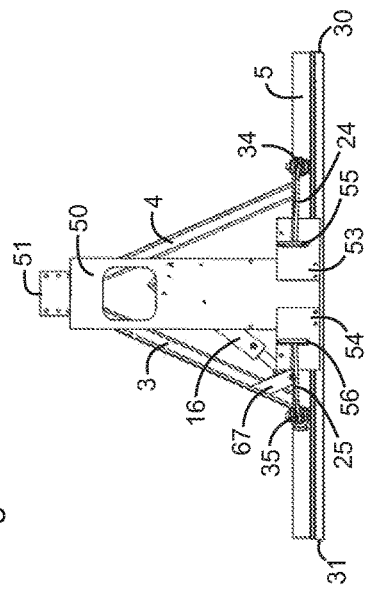

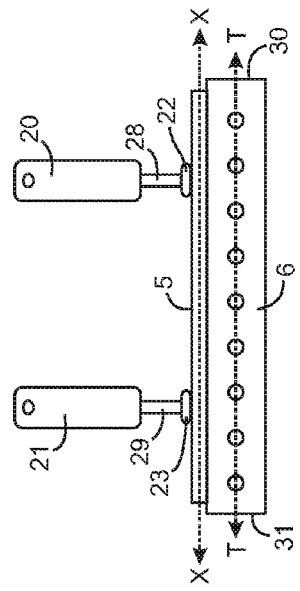
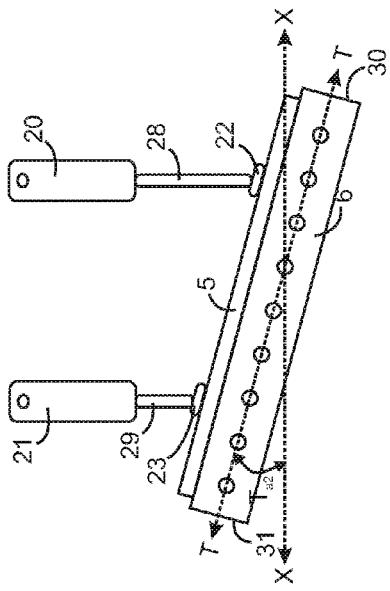
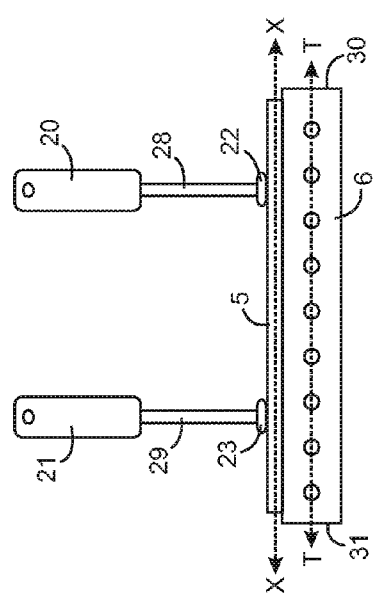
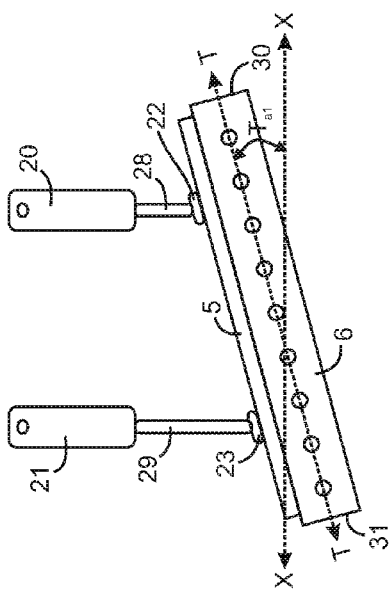

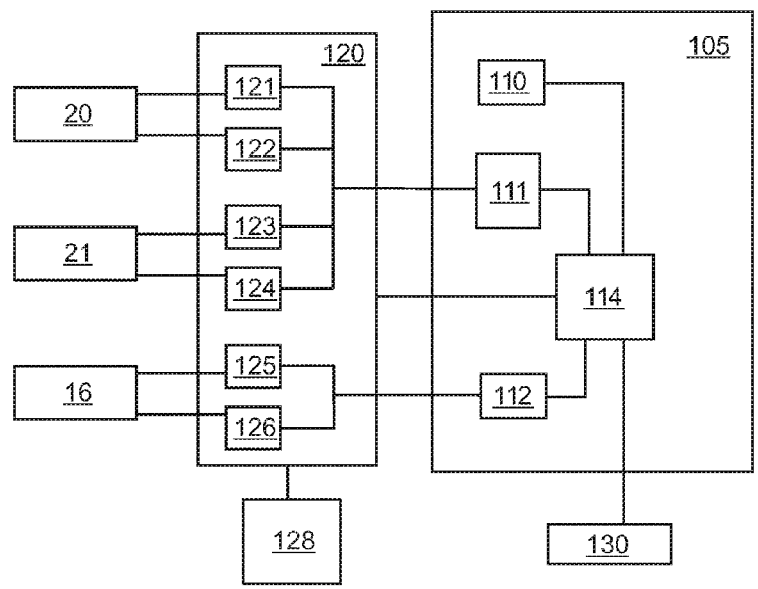
Fig. 9
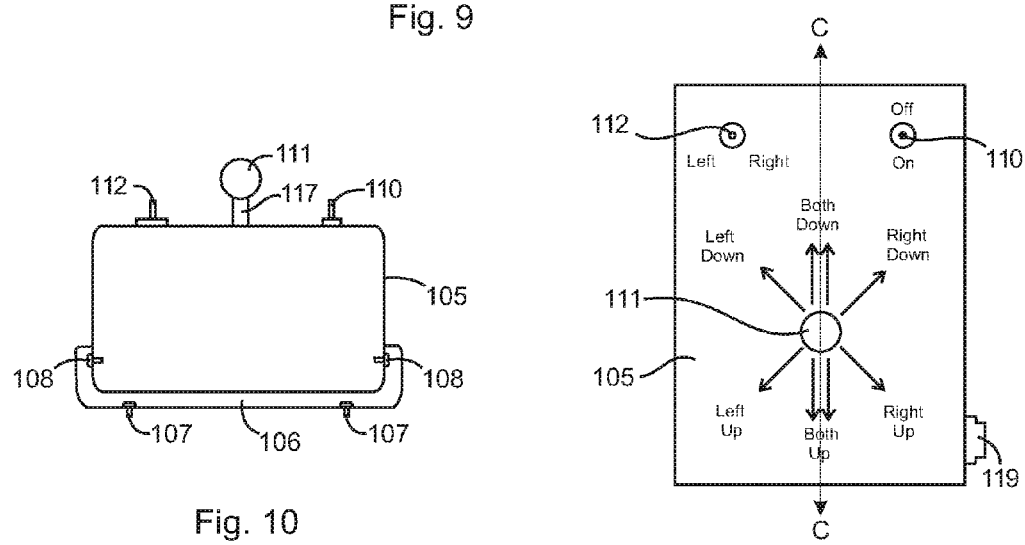
Fig. 10
Fig. 11
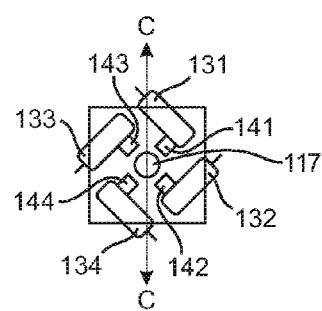
Fig. 12

JOYSTICK CONTROLLED SCRAPER BLADE ASSEMBLY

CROSS-REFERENCE TO RELATED APPLICATIONS

This application claims the benefit of U.S. Provisional Patent Application Ser. No. 62/259,809 filed Nov. 25, 2015, the entire contents of which is herein incorporated by reference.

FIELD

This application relates to soil-shifting vehicles, particularly to scraper blade assemblies therefor, more particularly to joystick control of such scraper blade assemblies on soil-shifting vehicles.

BACKGROUND

Small tractors and skid-steer vehicles are increasingly finding utility in a variety of landscaping applications. For fine grading applications, small tractors and skid-steer vehicles may be outfitted with a scraper blade, either belly mounted on tractors or forward mounted on tractors and skid-steer vehicles. One of the challenges in outfitting small tractors and skid-steer vehicles with scraper blades for fine grading applications is to provide the ability to accurately adjust the blade in multiple dimensions, often in a more confined space than is provided in conventional motor graders and bulldozers. Another challenge is to provide a scraper blade assembly that may be easily retrofitted to existing small tractors and skid-steer vehicles.

SUMMARY

In one aspect, there is provided a scraper blade assembly for a vehicle comprising: a frame mountable to the vehicle, the frame having a socket with a pivotable ball for connection to the vehicle, the pivotable ball configured to permit pivoting movement of the frame about a longitudinal axis, a transverse axis and a vertical axis of the vehicle when the frame is mounted to the vehicle; a scraper blade for engagement with a soil surface to be graded, the blade attached to a blade portion of the frame; a left hydraulic cylinder attached to a left side of the blade portion of the frame and to a left vehicle mount configured to be attached to the vehicle; a right hydraulic cylinder attached to a right side of the blade portion of the frame to a right vehicle mount configured to be attached to the vehicle, the left and right hydraulic cylinders configured to vertically move the blade portion of the frame and/or tilt the blade portion of the frame relative to horizontal; a third hydraulic cylinder for angling the blade with respect to the longitudinal axis of the vehicle by pivoting the blade portion about the vertical axis; electrically actuated valves for controlling extension and retraction of the left and right hydraulic cylinders; and, a control system for electrically actuating the valves, the control system comprising a single joystick configured so that movement of the joystick actuates the left hydraulic cylinder, the right hydraulic cylinder or simultaneously both the left and right hydraulic cylinders.

In another aspect, there is provided a tractor comprising the scraper blade assembly mounted thereon.

In another aspect, there is provided a skid-steer vehicle comprising the scraper blade assembly mounted thereon.

In another aspect, there is provided a kit for retrofitting an existing vehicle with a scraper blade assembly, the kit comprising a scraper blade assembly as described herein and instructions for mounting the scraper blade assembly to the existing vehicle.

In another aspect, there is provided a control system for controlling tilting of a scraper blade in a scraper blade assembly, the control system comprising two or more actuators, a slope sensor and a joystick, the slope sensor and joystick configured to automatically and manually control tilting of a scraper blade in a scraper blade assembly by actuating one or more of the two or more actuators, the slope sensor and joystick electronically connected in series to the two or more actuators.

The pivotable ball in the socket permits three degrees of freedom of movement of the frame. The single joystick permits independent or simultaneous control the left and right hydraulic cylinders. The pivotable ball in the socket, especially in a rear mounted configuration, cooperates with the single joystick to provide smooth and accurate blade placement even on the fly for finer control over earth moving operations, resulting in smoother transitions when shaping slopes while grading. In addition, the assembly is compact lending itself to use with smaller vehicles, for example tractors, especially small tractors, and skid-steer vehicles. Furthermore, the assembly may be readily retrofitted to existing vehicles, including belly mounting the assembly to a tractor between front and rear wheels of the tractor, or front mounting the assembly to a tractor or a skid-steer vehicle in front of the front wheels or tracks of the vehicle.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 4A depicts a top view of the scraper blade assembly of FIG. 3A.

FIG. 4B depicts a bottom view of the scraper blade assembly of FIG. 3A.

FIG. 4C depicts a right side view of the scraper blade assembly of FIG. 3A.

FIG. 4D depicts a front view of the scraper blade assembly of FIG. 3A.

FIG. 4E depicts a rear view of the scraper blade assembly of FIG. 3A.

FIG. 7A is a schematic drawing of a front view of a scraper blade on a frame with left and right blade tilting hydraulic cylinders attached to the frame, the blade shown in a lowered horizontal orientation.

FIG. 7B depicts the blade shown in FIG. 7A in a raised horizontal orientation.

FIG. 7C depicts the blade shown in FIG. 7A in a tilted orientation with a right side of the blade lower than the left side.

FIG. 7D depicts the blade shown in FIG. 7A in a tilted orientation with a right side of the blade higher than the left side.

FIG. 9 depicts a block diagram of a control system in a scraper blade assembly of the present invention.

FIG. 10 is a schematic diagram depicting an end view of a control box in a quick release bracket.

FIG. 11 depicts a top view of the control box of FIG. 10.

FIG. 12 depicts an underside view of a lid of the control box of FIG. 10 showing a configuration of four microswitches around a central column of a joystick.

DETAILED DESCRIPTION

Figure 1:
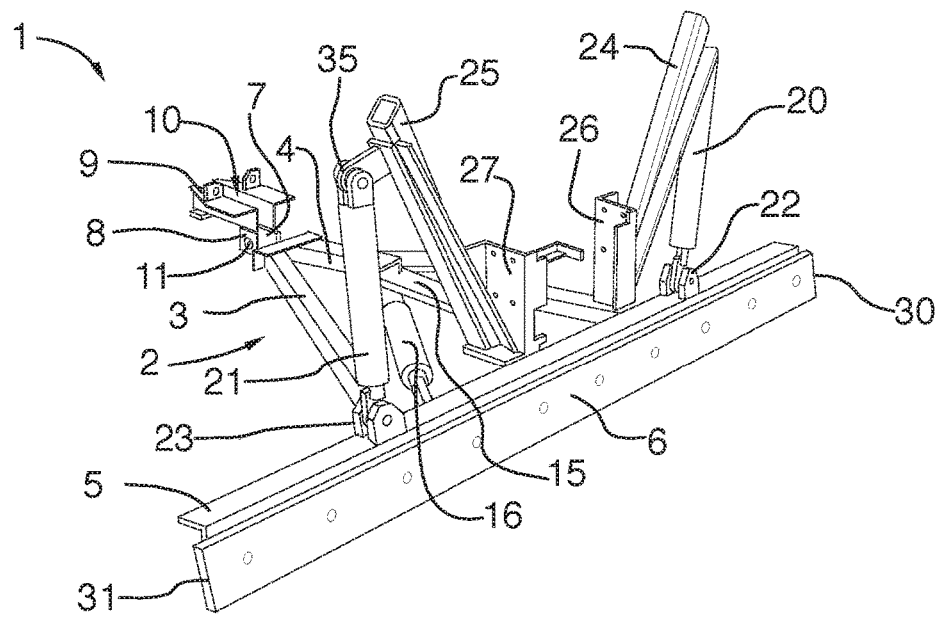
FIG. 1 depicts a front perspective view of one embodiment of a scraper blade assembly of the present invention.

In one embodiment, the socket with the pivotable ball for connection to the vehicle may be situated behind the blade. Preferably, the blade is situated forward on the frame and all other structures of the assembly are behind or above the blade. Such arrangements more readily permit mounting the assembly to existing hitching structures on the vehicle. Further, since the blade moves earth in a forward direction and there is often very little space in which to locate the scraper blade assembly, situating the socket and pivotable ball, and other structures of the assembly, behind the blade reduces the chance of earth and debris accumulating at the socket and pivotable ball, and other structures, thereby reducing the chance of a mechanical failure and providing a cleaner earth moving operation. In one embodiment, a mounting hitch may be configured to be rigidly mounted to a drawbar of the vehicle and configured to pivotally mount the socket with the pivotable ball to permit the pivoting movement of the frame. In one embodiment, the socket is an eye socket. In one embodiment, the pivotable ball may comprise a through aperture and the mounting hitch may comprise a clevis in which the pivotable ball is mounted by a clevis pin through the through aperture. In one embodiment, the frame comprises a pair of longitudinal frame members meeting at the socket and connected to the blade portion at transversely spaced-apart locations on the blade portion. The longitudinal frame members and blade portion of the frame thereby form a triangle, with an apex of the triangle located at the socket. The assembly may comprise a single socket with a pivotable ball.

In one embodiment, the third hydraulic cylinder may be oriented substantially horizontally to the frame. The third hydraulic cylinder may comprise a first end mounted to the vehicle, for example mounted to the vehicle proximate the longitudinal axis passing through the pivotable ball. The third hydraulic cylinder may comprise a second end mounted to the blade portion of the frame, for example mounted to the blade portion of the frame at a location transversely offset from the longitudinal axis passing through the pivotable ball. Extension and retraction of the third hydraulic cylinder may then pivot the frame about the vertical axis passing through the pivotable ball thereby causing the pivoting of the blade portion about the vertical axis thereby causing the angling of the blade with respect to the longitudinal axis. The assembly may further comprise electrically actuated valves for controlling the extension and retraction of the third hydraulic cylinder. To actuate the electrically actuated valves controlling the third hydraulic cylinder, the control system may further comprise a switch. The switch may be any suitable switch, for example a momentary switch such as a toggle switch. The switch may have a neutral position in which neither extension nor retraction of the third hydraulic cylinder is actuated, an extend position in which the third hydraulic cylinder is actuated to extend and a retract position in which the third hydraulic cylinder is actuated to retract. Extension of the hydraulic cylinder angles the blade in one direction with respect to the longitudinal axis and retraction of the hydraulic cylinder angles the blade in an opposite direction with respect to the longitudinal axis.

The left and right hydraulic cylinders may be oriented in any suitable direction to facilitate left/right tilting and vertical movement of the frame, and therefore left/right tilting and vertical movement of the blade. With the blade starting in a horizontal un-tilted orientation (i.e. parallel to the transverse axis of the vehicle), the blade may be tilted to the left by raising the right side of the blade in relation to the left side of the blade by actuating the right hydraulic cylinder, or by lowering the left side of the blade in relation to the right side by actuating the left hydraulic cylinder, or both. Likewise, the blade may be tilted to the right by raising the left side of the blade in relation to the right side of the blade by actuating the left hydraulic cylinder, or by lowering the right side of the blade in relation to the left side by actuating the right hydraulic cylinder, or both. The blade thereby rotates about the longitudinal axis of the vehicle when the blade is tilted. A tilt angle may be defined as the angle formed by the transverse axis of the blade and the transverse axis of the vehicle. The blade may be raised or lowered by actuating both cylinders simultaneously. Vertical movement or lift of the blade involves changing a height of the blade with respect to the ground, i.e. raising or lowering the blade with respect to the ground.

In one embodiment, the left and right hydraulic cylinders may be oriented upwardly from the blade portion of the frame. In one embodiment, the left and right hydraulic cylinders are attached to left and right vehicle mounts, respectively, configured to mount the assembly to the vehicle. Configuration of the vehicle mounts may differ depending on whether the scraper blade assembly is being mounted under a vehicle, such as a tractor, or to a front of a vehicle, such as a tractor or a skid-steer vehicle. When the left and right hydraulic cylinders are oriented upwardly from the blade portion of the frame, extension of the left hydraulic cylinder would lower the left side of the blade portion (and therefore the blade), while retraction of the left hydraulic cylinder would raise the left side of the blade portion (and therefore the blade). Likewise, extension and retraction of the right hydraulic cylinder lowers and raised the right side of blade portion (and therefore the blade). To tilt the blade to the left, the left hydraulic cylinder may be extended while the right hydraulic cylinder may be retracted, remain unmoved or extended by a lesser amount than the left hydraulic cylinder. Tilting the blade to the right may be similarly accomplished by extending the right hydraulic cylinder while the left hydraulic cylinder is retracted, remains unmoved or is extended by a lesser amount than the right hydraulic cylinder. Extending both the left and right hydraulic cylinders would lower the blade as a whole while retracting the left and right hydraulic cylinders would raise the blade as a whole.

The left, right and third hydraulic cylinders are preferably pivotally mounted at the various structures to which the cylinders are mounted. In one embodiment, the left, right and third hydraulic cylinders may be mounted to a common mounting plate, the mounting plate mounted to the vehicle.

Extension and retraction of the left, right and third hydraulic cylinders is accomplished with hydraulic fluid provided to the hydraulic cylinders under pressure from a hydraulic fluid reservoir. In one embodiment, a hydraulic valve manifold comprising electrically actuated valves (e.g. solenoids) may be used to control hydraulic fluid flow to the hydraulic cylinders. Each port of each hydraulic cylinder may be in fluid communication with the hydraulic fluid reservoir through hydraulic fluid lines. Fluid pressure to each port may be controlled by dedicated valves in the valve manifold. In one embodiment, two valves in the manifold may be employed to control extension and retraction of the third hydraulic cylinder, while four valves may be employed to control extension and retraction of the left and right hydraulic cylinders.

In one embodiment, the electrically actuated valves for the left and right hydraulic cylinders may comprise first, second, third and fourth electrically actuated valves. The first electrically actuated valve may control extension of the right hydraulic cylinder. The second electrically actuated valve may control retraction of the right hydraulic cylinder. The third electrically actuated valve may control extension of the left hydraulic cylinder. The fourth electrically actuated valve may control retraction of the left hydraulic cylinder.

The left and right hydraulic cylinders may be controlled independently or simultaneously by appropriate actuation of the electrically actuated valves. In the present invention, such control is managed from a single control device, that is, from a single joystick. In one embodiment, the joystick may comprise first, second, third and fourth micro-switches surrounding a central stick. The central stick may be movable to activate the micro-switches, the first micro-switch actuating the first electrically actuated valve, the second micro-switch actuating the second electrically actuated valve, the third micro-switch actuating the third electrically actuated valve and the fourth micro-switch actuating the fourth electrically actuated valve. Thus, the first micro-switch actuates the first valve to control extension of the right hydraulic cylinder. The second micro-switch actuates the second valve to control retraction of the right hydraulic cylinder. The third micro-switch actuates the third valve to control extension of the left hydraulic cylinder. The fourth micro-switch actuates the fourth valve to control retraction of the left hydraulic cylinder. Moving the joystick directly toward a micro-switch results in one of the hydraulic cylinders being extended or retracted.

The micro-switches around the central stick may be advantageously arranged to provide both independent and simultaneous control over left and right hydraulic cylinder functions. Thus, the first and fourth micro-switches may be arranged diametrically opposed to each other along a first axis of movement of the central stick. The second and third micro-switches may be arranged diametrically opposed to each other along a second axis of movement of the central stick. The first and second axes of movement may be substantially orthogonal to each other and the central stick may be movable in the first and second axes. The central stick may also movable in an intermediate axis of movement between the first and second axes. Thus, when the central stick moves in the first axis, the central stick may activate the first or fourth micro-switches depending on direction of movement of the stick. Likewise, when the central stick moves in the second axis, the central stick may activate the second or third micro-switches. Such activations result in either the left or right cylinder either extending or retracting thereby causing the blade to tilt either left or right. However, when the central stick moves in the intermediate axis, the central stick may activate both the first and third micro-switches or both the second and fourth micro-switches. Activating both the first and third micro-switches causes both the left and right hydraulic cylinders to extend simultaneously thereby lowering the blade without tilting. Activating both the second and fourth micro-switches causes both the left and right hydraulic cylinders to retract simultaneously thereby raising the blade without tilting. In this manner, both the tilting and lifting functions of the blade may be accomplished with a single joystick.

As described above, the control system may comprise an operator control mode in which operator activated controls such as a joystick and a switch are used. In other embodiments, the control system may also be configured for automatic and/or semi-automatic control modes. Switches for switching between control modes may be provided, however, in a particularly preferred embodiment the automatic and/or semi-automatic control modes may be overridden without the necessity of throwing a switch. For example, the simple action of starting to use the joystick may override automatic or semi-automatic control without first actuating a switch.

Automatic and semi-automatic control systems may comprise an electronic controller programmed to control the left, right and third hydraulic cylinders without operator input. The electronic controller may be in electronic communication with the electronically actuated valves and any sensors in the system. The electronic controller may have a fixed program or may be programmable by an operator or a trained technician. Electronic controllers are generally known in the art, for example logic circuits (e.g. a programmable logic circuit (PLC)). A logic circuit may comprise a microprocessor with a central processing unit, random access memory (RAM), read only memory (ROM), long-term memory capacity, an input device, an output device and other components of such circuits. The electronic controller may be pre-programmed with instructions in the form of computer code to operate the electronically actuated valves and the sensors. The pre-programmed instructions may be alterable by a trained technician and/or an operator. One or more sensors may be employed to determine one or more parameters, for example ground level, slope of the ground and parameters associated with the scraper blade assembly (e.g. hydraulic fluid pressure, strain on the blade, and the like). Sensors may include, for example, slope sensors (e.g. laser level sensors, accelerometers, inclinometers, etc.), hydraulic fluid pressure sensors and the like.

In one embodiment, a slope sensor (e.g. a laser level) and a joystick may be in electronic communication with the electronically actuated valves where the slope sensor and joystick are electronically in series. In one embodiment, the joystick may be electronically between the slope sensor and the electronically actuated valves. For example, the slope sensor and joystick may be wired in series so that they both send signals through the same wires to the electronically actuated valves. An electronic controller is preferably used to process signals from the slope sensor. The electronic controller may or may not be used to process signals from the joystick. In automatic mode, the electronic controller processes signals from the slope sensor and actuates the electronically actuated valves in response to signals from the slope sensor. However, at any time an operator may interrupt automatic control by taking hold of the joystick and moving the joystick to override the signals from the slope sensor. Such an arrangement provides for automatic and manual control, rather than automatic or manual control. Automatic and manual control does not require a switch to toggle between the two modes, whereas automatic or manual control requires a switch to toggle between the two modes because electronic signals from the slope sensor would be in parallel to electronic signals from the joystick.

In one embodiment, the control system may further comprise means for transmitting data between the electronic controller and a remote computer. For example, the electronic controller may be wirelessly interfaced with a network of computers. Wireless networks, for example the world wide web or internet, are preferred, and the electronic controller may be connected through the network to any suitable kind of remote computer, for example a desk top computer, a portable computer, a personal data device (PDA) or a cell phone. An operator and/or trained technician would then be able to alter the pre-programmed instructions from a remote location.

In one embodiment, the control system may be contained in a control box mounted on the vehicle and configured to contain the control system. The control box may be a permanent fixture on the vehicle or may comprise a release mechanism configured to permit dismounting the control box from the vehicle. Preferably, the control box is dismountable from the vehicle with a quick release mechanism. Dismountable control boxes lend themselves retrofitting existing vehicles.

The scraper blade assembly may comprise a number of features that permit existing vehicles to be retrofitted with the scraper blade assembly. Such features include situating the socket with the pivotable ball for connection to the vehicle behind the blade in order to use an existing vehicle drawbar for pivotally mounting the scraper blade assembly to vehicle. Further, the blade may be situated forward on the frame with all other structures of the scraper blade assembly behind or above the blade to permit easy mounting and dismounting of the assembly from the vehicle using existing mounting features on the vehicle without excessive modification to the vehicle. Situating the blade forward on the frame also reduces contact of control structures with earth being pushed by the blade. Furthermore, containing the control system in a dismountable control box permits locating system control in a convenient location close to where the operator will be stationed in the vehicle. In addition, a hydraulic valve manifold and hydraulic fluid reservoir may be contained in a dismountable unit that may be mounted to the existing vehicle in any convenient location, with hydraulic fluid lines and any electrical connections readily added to make necessary connections between the elements of the scraper blade assembly.

Figure 2:
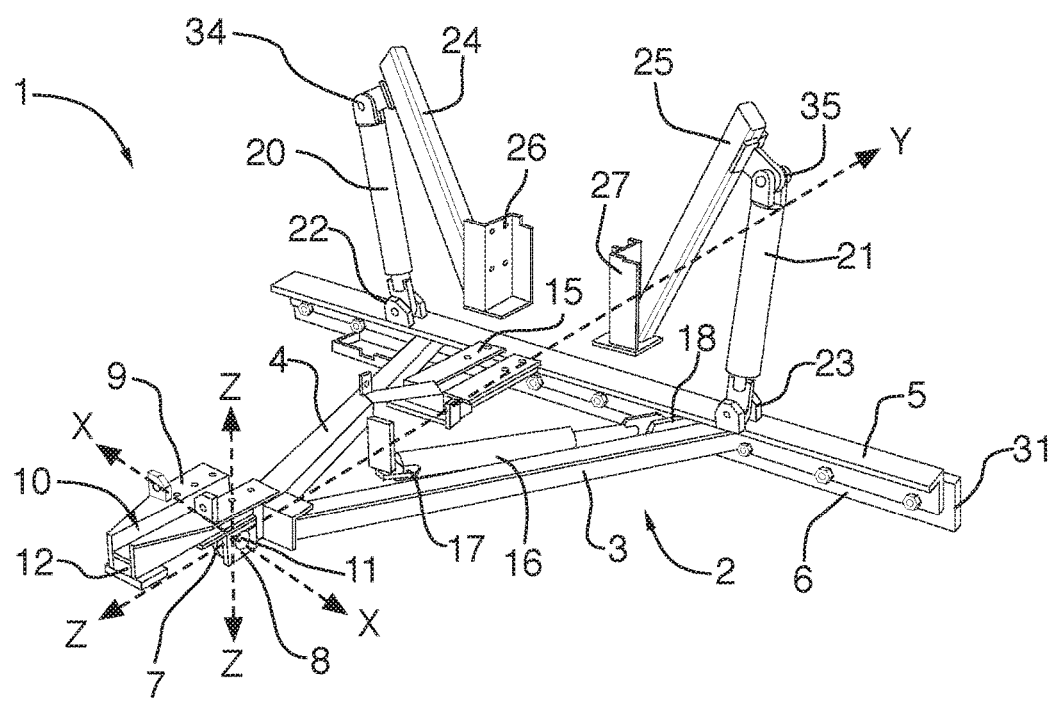
FIG. 2 depicts a rear perspective view of the scraper blade assembly of FIG. 1.
Figure 3A:
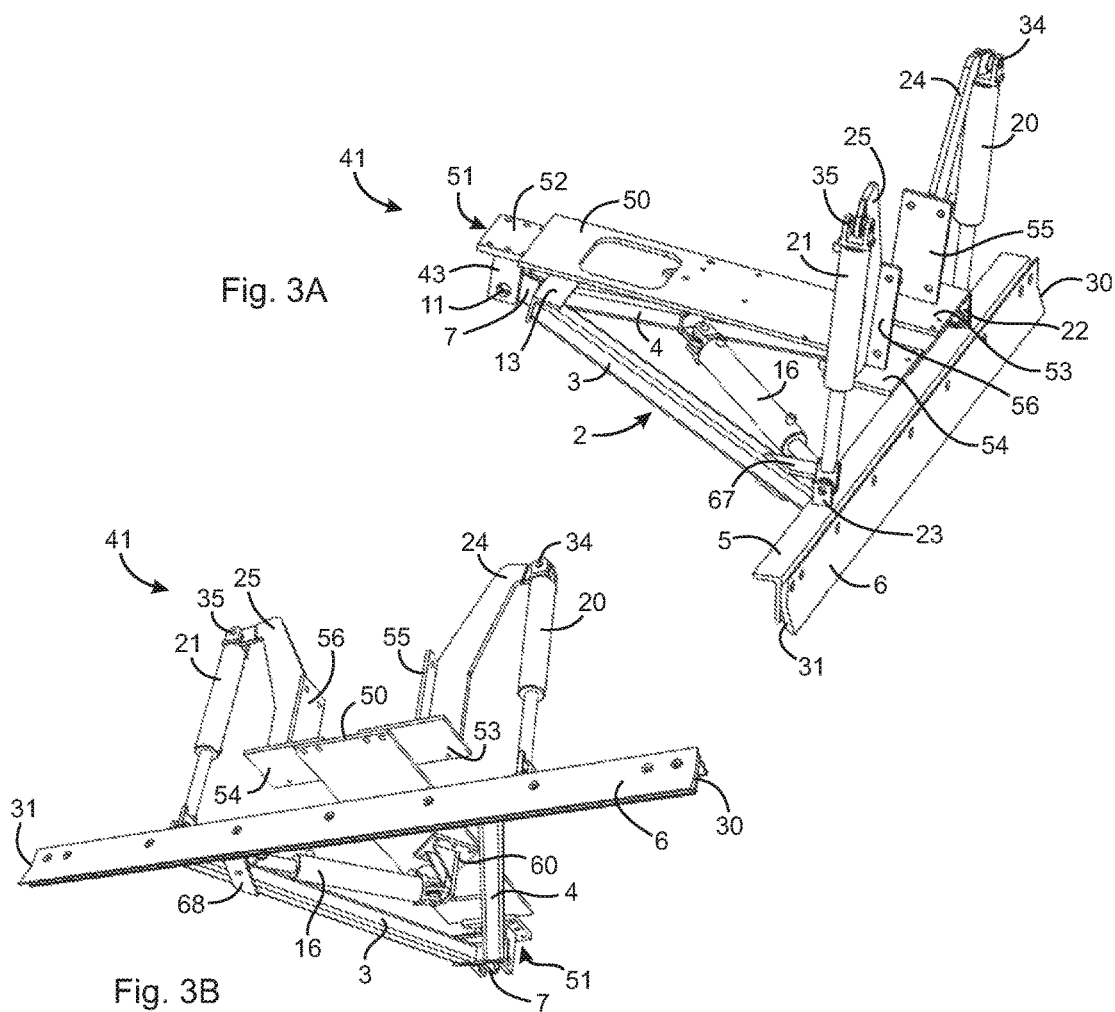
FIG. 3A depicts a front top perspective view of another embodiment of a scraper blade assembly of the present invention.
Figure 3B:
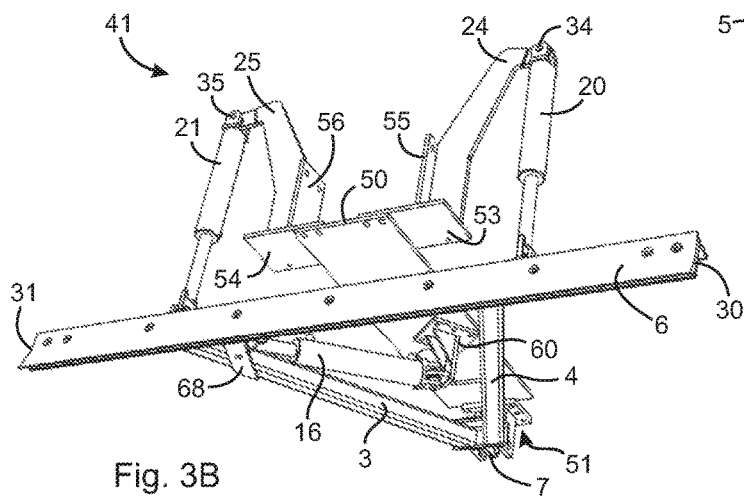
FIG. 3B depicts a front bottom perspective view of the scraper blade assembly of FIG. 3A.
Figure 3C:
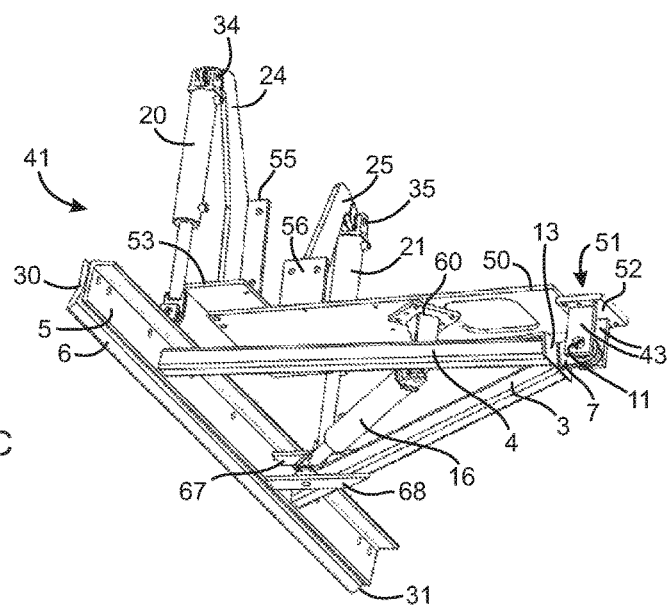
FIG. 3C depicts a rear bottom perspective view of the scraper blade assembly of FIG. 3A.
Figure 5:
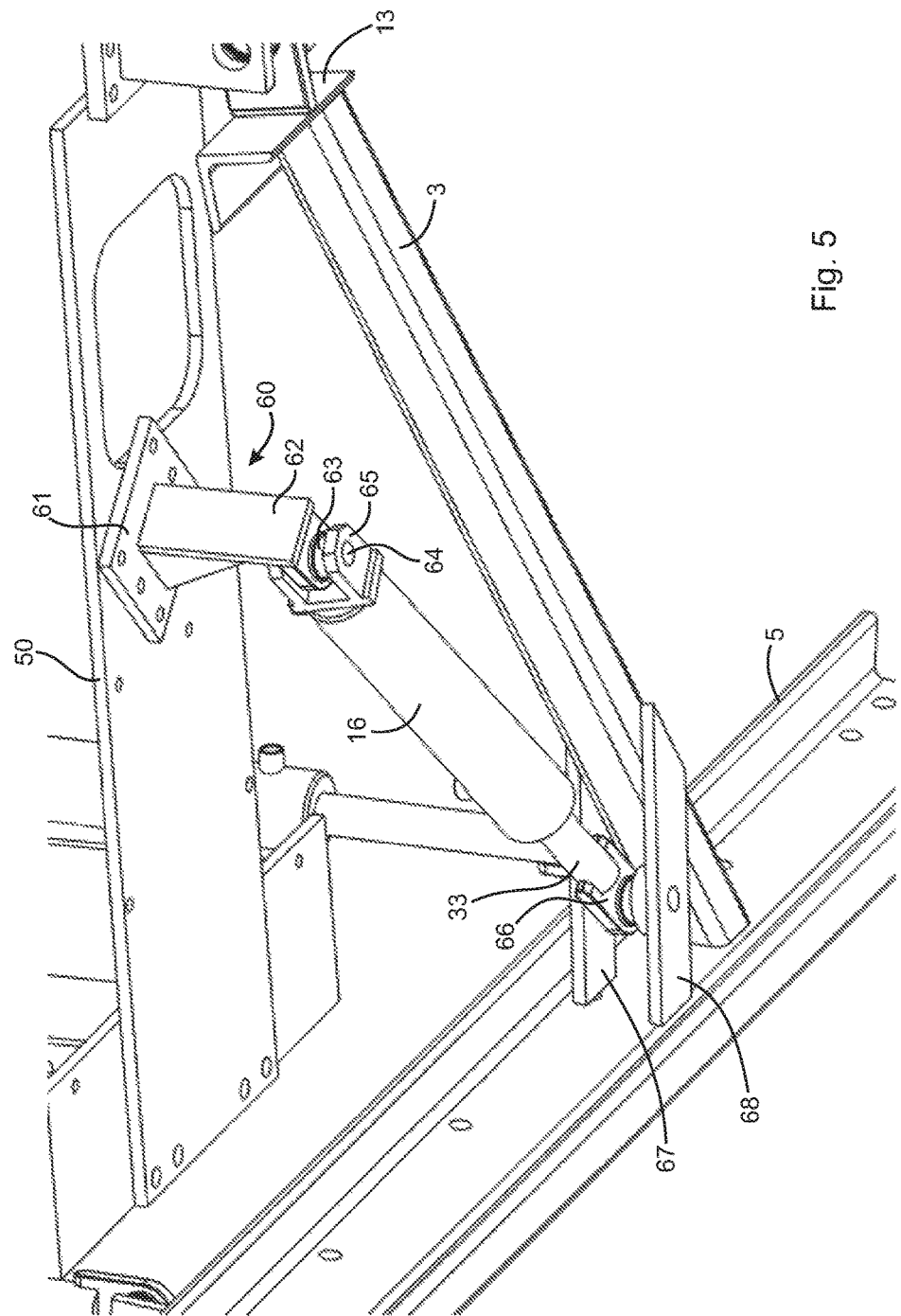
FIG. 5 depicts a magnified view of a bottom of the scraper blade assembly of FIG. 3A showing how a horizontally oriented hydraulic cylinder is mounted.

An embodiment of a scraper blade assembly 1 for a tractor is illustrated in FIG. 1, and FIG. 2, not showing a control system, electrically actuated valves or hydraulic lines. The scraper blade assembly 1 is particularly adapted to be belly mounted on a small tractor between front and rear wheels of the tractor. The scraper blade assembly 1 comprises an A-frame 2 comprising a pair of longitudinally extending square tubes 3, 4 connected to a transversely extending angle bracket 5, the angle bracket 5 having a front face to which a scraper blade 6 is secured. First ends of the square tubes 3, 4 are securely connected to the angle bracket 5 at transversely spaced-apart locations on either side of centerline longitudinal axis Y-Y of the tractor. Second ends of the square tubes 3, 4 are securely connected an A-frame angle tie 13 to which a clevis hitch 8 is attached. The A-frame 2 is triangular being formed of the square tubes 3, 4 and the angle bracket 5, with three apexes where the square tubes 3, 4 are connected to the angle bracket 5 and where the square tubes 3, 4 are connected to a ball and socket joint 7. The ball and socket joint 7 is mounted in the clevis hitch 8 secured to a rear mounting bracket 9 having a channel 10 configured to receive a drawbar of the tractor. The drawbar of the tractor is securable within the channel 10 thereby mounting the scraper blade assembly 1 to the tractor proximate a rear of the tractor. The ball and socket joint 7 is mounted in the clevis hitch 8 by a pin through clevis apertures 11 and a through aperture in the ball of the socket. The rear mounting bracket 9 comprises a receiver 12 configured to receive and secure a replacement drawbar to replace the drawbar of the tractor being used for mounting the rear mounting bracket 9 on the tractor.

The frame 2 further comprises an angle cylinder tractor mount 15 configured to be connected (e.g. bolted) to a frame of the tractor. The angle cylinder tractor mount 15 comprises a mounting flange 17 that pivotally supports one end of a horizontally oriented hydraulic cylinder 16 proximate the centerline longitudinal axis Y-Y of the tractor. Another end of the horizontally oriented hydraulic cylinder 16 is connected to the angle bracket 5 at a cylinder mount 18 transversely offset from the centerline longitudinal axis Y-Y of the tractor. Extension and retraction of the horizontally oriented hydraulic cylinder 16 results in pivoting of the frame 2 about a vertical axis Z-Z, which results in angling the blade 6 with respect to the centerline longitudinal axis Y-Y of the tractor as described in more detail below in relation to FIG. 8A, FIG. 8B and FIG. 8C.

Extending upwardly from the angle bracket 5 are left and right hydraulic cylinders 20, 21, respectively. Ends of the left and right hydraulic cylinders 20, 21 are pivotally mounted to the angle bracket 5 at left and right lower pivot mounts 22, 23, respectively. The left and right lower pivot mounts 22, 23 are transversely offset from each other on the angle bracket 5 on opposite sides of the centerline longitudinal axis Y-Y of the tractor. Opposite ends of the left and right hydraulic cylinders 20, 21 are pivotally mounted to left and right lift arms 24, 25, respectively at left and right upper pivot mounts 34, 35, respectively. The left and right lift arms 24, 25 comprise left and right mounting brackets 26, 27, respectively, which are configured to mount the lift arms 24, 25 to existing structures on the tractor, for example the frame of the tractor. In this way, the scraper blade assembly 1 is mounted on the tractor at four locations: at the rear mounting bracket 9 proximate the ball and socket joint 7; at the left mounting bracket 26; at the right mounting bracket 27 and at the angle cylinder tractor mount 15.

Different combinations of extension and retraction of the left and right hydraulic cylinders 20, 21 result in adjusting height of the blade 6 off the ground, or tilt angle of the blade 6 with respect to a horizontal transverse axis X-X of the tractor. Various tilting options are described in more detail below in relation to FIG. 7A, FIG. 7B, FIG. 7C and FIG. 7D.

The configuration of the scraper blade assembly 1 leads to finer control of the blade tilt angle than is possible with prior art assemblies. The triangular frame 2 is pivotally suspended under the tractor at three pivoting points in the substantially horizontal plane, which are the ball and socket joint 7 and the left and right lower pivot mounts 22, 23. Further, each side of the frame 2 is pivotally suspended under the tractor at only three pivoting points in the substantially vertical plane. On the left side, the frame 2 is suspended under the tractor at the ball and socket joint 7, the left lower pivot mount 22 and the left upper pivot mount 34. On the right side, the frame 2 is suspended under the tractor at the ball and socket joint 7, the right lower pivot mount 23 and the right upper pivot mount 35. The ball and socket joint 7 is a common pivot point for both the left and ride sides 30, 31 of the blade 6. Finer control over tilt angle arises, at least in part, from the pivot points on each side forming triangles in the vertical plane with a common ball and socket joint 7 and with two sides of each of the triangles having fixed lengths. On the left side, the two sides with fixed lengths are the distance between the ball and socket joint 7 and the left lower pivot mount 22, and the distance between the ball and socket joint 7 and the left upper pivot mount 34. These two distances are fixed due to the rigidity of the square tube 4 of the frame 2 and the rigidity of the left lift arm 24 mounted to the tractor through left mounting bracket 26. The right side has a similar arrangement between the ball and socket joint 7 and the right lower and upper pivot mounts 23, 35. Only the sides of the triangles in the vertical plane represented by the distances between the lower and upper pivot mounts (22 and 34 on the left side, and 23 and 35 on the right side) are variable in distance due to the action of the left and right hydraulic cylinders 20, 21, respectively. Thus, when the left and/or right hydraulic cylinders 20, 21 retract and/or extend, the frame 2 is forced to pivot only at the ball and socket joint 7. The triangular configurations in both the vertical and horizontal planes, with three fixed length sides in the triangle in the horizontal plane and two fixed length sides in the triangles in the vertical plane means that there is no sloppiness in the tilting of the frame 2 and the angle of tilt is only affected by the amount of extension or retraction of the left and right hydraulic cylinders 20, 21. Thus, extension or retraction of the left and/or right hydraulic cylinders 20, 21 is correlated precisely with the amount of pivoting at the common ball and socket joint 7 and therefore correlated precisely with the angle of tilt.

In prior art configurations, the pivoting points associated with left and right blade tilting are separate giving rise to at least four pivoting points in the substantially horizontal plane, at least two of which permit tilting of the frame and blade. Because the frame and blade in the prior art configurations can tilt at two or more pivoting points when a given lift cylinder is extended or retracted, the extension or retraction of one lift cylinder is not precisely correlated with the angle of pivoting at only one pivot point, thereby introducing sloppiness into the ability to tilt the blade by a precise angle. The configuration in the present invention therefore provides improved control over the tilt function of the blade. For example, a grade control of about 1/32" over 300 feet of grade is achievable with the present invention.

Another embodiment of a scraper blade assembly 40 for a tractor is illustrated in FIG. 3A, FIG. 3B, FIG. 3C, FIG. 4A, FIG. 4B, FIG. 4C, FIG. 4D, FIG. 4E, FIG. 5 and FIG. 6, also not showing a control system, electrically actuated valves or hydraulic lines. While the scraper blade assembly 40 differs from the scraper blade assembly 1, many elements are shared between the two and the configuration similarly gives rise to finer control over the blade tilt angle. Elements that are the same between the two embodiments are identified with the same reference numerals. The following description of the scraper blade assembly 40 highlights differences between the scraper blade assembly 40 and the scraper blade assembly 1.

In scraper blade assembly 41, the left and right hydraulic cylinders 20, 21 and the horizontally oriented hydraulic cylinder 16 are connected to a common transmission plate 50, which is mountable to the frame of the tractor, for example by bolting. The common transmission plate 50 facilitates packaging the scraper blade assembly 40 in a kit designed to simplify retrofitting an existing tractor with a scraper blade assembly.

The left and right hydraulic cylinders 20, 21 are pivotally mounted to the left and right lift arms 24, 25, which are mounted to left and right horizontal plates 53, 54, respectively, for example by welding or bolting. The left and right horizontal plates 53, 54 are mounted to the transmission plate 50, for example by welding or bolting. Left and right vertical plates 55, 56 may be attached to the left and right lift arms 24, 25 or to both the left and right lift arms 24, 25 and the left and right horizontal plates 53, 54 to provide further locations for mounting the scraper blade assembly 40 to the tractor frame or other structures on the tractor.

The horizontally oriented hydraulic cylinder 16 is connected at one end to the transmission plate 50 through a cylinder bracket 60 attached to an underside of the transmission plate 50. The cylinder bracket 60 may comprise a bracket plate 61 that is attached to the transmission plate 50, for example by bolts or welding. A downwardly depending support plate 62 attached to the bracket plate 61 may comprise a ball and socket 63 that permits pivotal connection of the horizontally oriented hydraulic cylinder 16 to the cylinder bracket 60 by virtue of a pin 64 through a clevis connection 65 on the horizontally oriented hydraulic cylinder 16 and a through aperture in the ball of the ball and socket 63. The other end of the horizontally oriented hydraulic cylinder 16 may be pivotally connected to the frame 2 through a similar connection involving a ball and socket 66 attached to an end of a cylinder rod 33 of the horizontally oriented hydraulic cylinder 16, the ball and socket 66 disposed between upper and lower plates 67, 68, respectively, the upper and lower plates 67, 68 attached to the angle bracket 5 and the square tube 3, for example by welding.

The frame 2 is pivotally connected to the tractor at a pivot block 51. The pivot block 51 comprises a pivot block plate 52, which may be mounted to the tractor frame or other structure of the tractor, for example by bolting. Spaced-apart flanges 43 depend from the pivot block plate 52. The ball and socket joint 7 attached to the A-frame angle tie 13 is pivotally secured between the flanges 43 by a pin (not shown) through the clevis apertures 11 in the flanges 43 and the aperture in the ball in the socket.

Figure 6A:
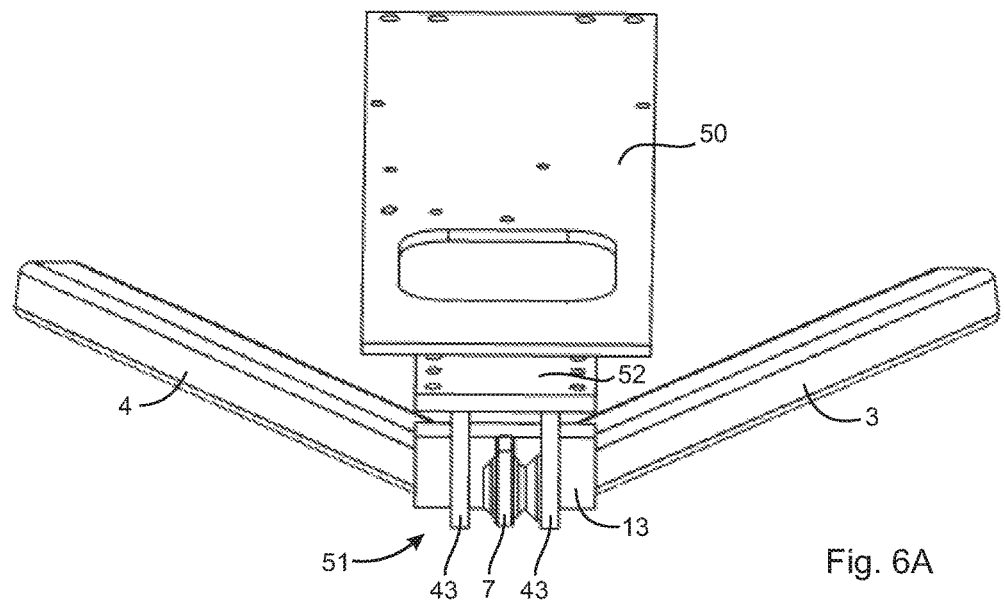
FIG. 6A depicts a magnified rear view of a pivot block of the scraper blade assembly of FIG. 3A.
Figure 6B:
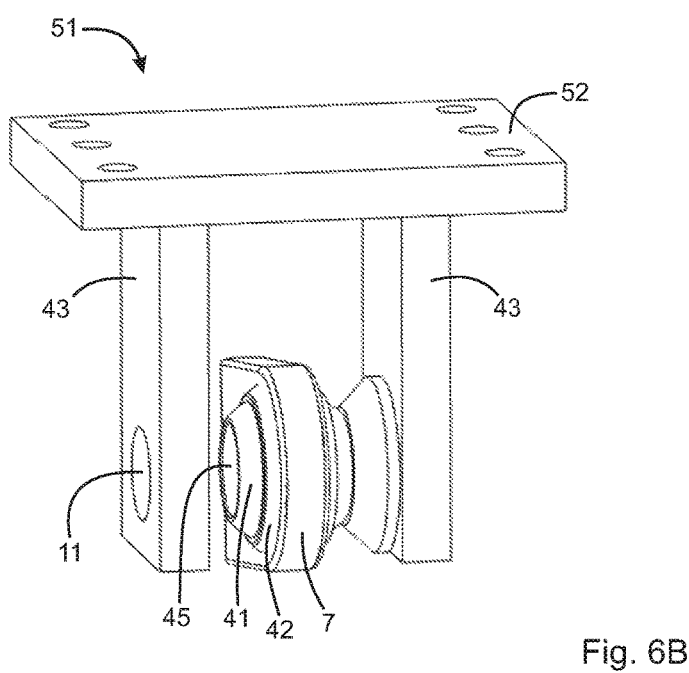
FIG. 6B depicts an alternative magnified view of the pivot block shown in FIG. 6A in isolation.

With reference to FIG. 6A and FIG. 6B, the ball and socket joint 7 that provides increased degrees of freedom for the scraper blade assembly 40 is shown in more detail. A ball 41 is rotationally nested in a socket 42 permitting rotation of the ball 41 in three dimensions in the socket 42. The ball and socket joint 7 is situated between spaced apart flanges 43 of a clevis in the pivot block 51 of the scraper blade assembly 40 (or of the clevis hitch 8 of the scraper blade assembly 1), the flanges 43 comprising opposed clevis apertures 11. A pin (not shown) is inserted through the clevis apertures 11 and a through aperture 45 in the ball 41 thereby securing the ball and socket joint 7 in the pivot block 51 (or clevis hitch 8). Even with the pin inserted through the through aperture 45 in the ball 41, the ball 41 enjoys sufficient range of rotational movement and the tolerances between the flanges 43 and the ball and socket joint 7 are large enough to permit sufficient movement of the frame 2 in three degrees of freedom for tilting and angling operations.

With reference to FIG. 7A, FIG. 7B, FIG. 7C and FIG. 7D, with left and right cylinder rods 28, 29, respectively, of left and right hydraulic cylinders 20, 21 both extended to the same length (see FIG. 7A), the blade 6 is in a lowered position and a transverse axis T-T of the blade 6 is parallel to the horizontal transverse axis X-X of the tractor, i.e. the blade 6 is oriented horizontally and is therefore un-tilted. When the left and right cylinder rods 28, 29 are retracted by the same amount (see FIG. 7B), the blade 6 is in a raised position, but the transverse axis T-T of the blade 6 is still parallel to the horizontal transverse axis X-X of the tractor and is therefore still un-tilted. If the right hydraulic cylinder rod 29 is extended farther than the left hydraulic cylinder rod 28 (see FIG. 7C), then a right side 31 of the blade 6 is lower than a left side 30 of the blade 6 and the transverse axis T-T of the blade 6 forms a tilt angle $T_{a1}$ with respect to the horizontal transverse axis X-X of the tractor. If the right hydraulic cylinder rod 29 is extended less than the left hydraulic cylinder rod 28 (see FIG. 7D), then a right side 31 of the blade 6 is higher than a left side 30 of the blade 6 and the transverse axis T-T of the blade 6 forms a tilt angle $T_{a2}$ with respect to the horizontal transverse axis X-X of the tractor. As described in more detail below, the height of the blade as well as the direction and extent of the tilt can be smoothly and accurately controlled with a single joystick.

Figure 8C:
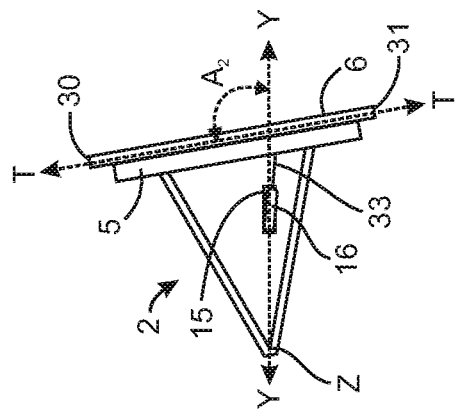
FIG. 8C depicts the blade shown in FIG. 8A angled so that a right side of the blade is longitudinally forward of a left side of the blade.
Figure 8B:
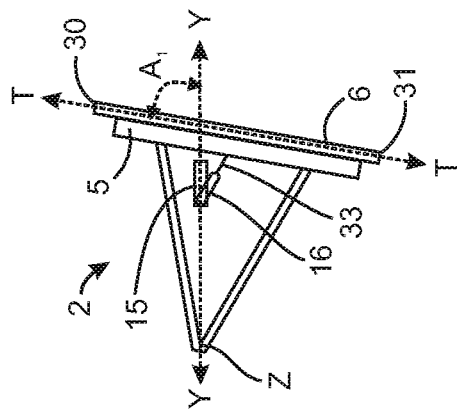
FIG. 8B depicts the blade shown in FIG. 8A angled so that a right side of the blade is longitudinally rearward of a left side of the blade.
Figure 8A:
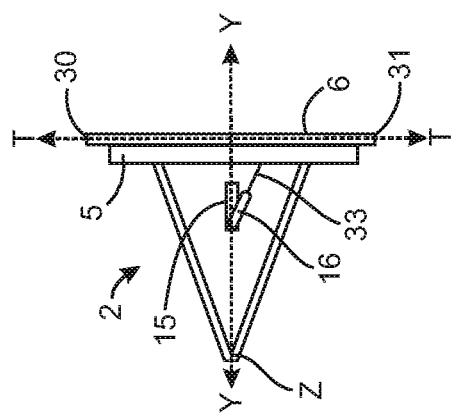
FIG. 8A is a schematic drawing of a top view of a scraper blade on a frame with a blade angling hydraulic cylinder attached to the frame, the blade shown in a transverse orientation.

With reference to FIG. 8A, FIG. 8B and FIG. 8C, the horizontally oriented hydraulic cylinder 16 may be actuated to angle the blade 6 from a transverse orientation as seen in FIG. 8A to the right as seen in FIG. 8B or the left as seen in FIG. 8C. With the horizontal cylinder rod 33 partially extended (FIG. 8A), the transverse axis T-T of the blade 6 is orthogonal to the centerline longitudinal axis Y-Y of the tractor. Thus, the blade 6 is perpendicular to a direction of travel of the tractor and is in position for shifting earth directly forward. When the horizontal cylinder rod 33 is retracted (FIG. 8B), the right side of the frame 2 is pulled causing the frame 2 to pivot about the vertical axis at point Z thereby pulling the right side 31 of the blade 6 longitudinally rearward as the blade 6 follows an arcuate path about the point Z. Thus, the right side 31 of the blade 6 is longitudinally offset rearward of the left side 30 of the blade 6 and the transverse axis T-T of the blade 6 forms an angle $A_1$ with the centerline longitudinal axis Y-Y of the tractor. Likewise, when the horizontal cylinder rod 33 is extended (FIG. 8C), the right side of the frame 2 is pushed causing the frame 2 to pivot about the vertical axis at point Z thereby pushing the right side 31 of the blade 6 longitudinally forward as the blade 6 follows an arcuate path about the point Z. Thus, the right side 31 of the blade 6 is longitudinally offset forward of the left side 30 of the blade 6 and the transverse axis T-T of the blade 6 forms an angle $A_2$ with the centerline longitudinal axis Y-Y of the tractor. If the horizontally oriented hydraulic cylinder 16 was connected to the angle bracket 5 on the other side of the centerline longitudinal axis Y-Y of the tractor, extending and retracting the horizontal cylinder rod 33 would have the opposite effect from what is described above on angling the blade 6. FIG. 8A, FIG. 8B and FIG. 8C show the horizontally oriented hydraulic cylinder 16 connected to the angle cylinder tractor mount 15 at a barrel end and to the angle bracket 5 at an end of the horizontal cylinder rod 33, but the connections of the horizontally oriented hydraulic cylinder 16 may be reversed, in which case extension and retraction of the horizontal cylinder rod 33 would result in angling the blade 6 in a reverse manner as described above.

With reference to FIG. 9, FIG. 10, FIG. 11, and FIG. 12, a control system 100 comprises a control box 105 and one or more laser level sensors 130 for controlling extension and retraction of the hydraulic cylinders 16, 28, 29 in the scraper blade assembly of FIG. 1. The control box 105 controls activation of electrically actuated solenoids 121, 122, 123, 124, 125, 126 in a hydraulic valve manifold 120. The solenoids 121, 122, 123, 124, 125, 126 control hydraulic fluid flow from a hydraulic fluid reservoir 128 through hydraulic fluid lines to the hydraulic cylinders 16, 20, 21. Solenoids 121, 122 control hydraulic fluid flow to fluid ports on the left hydraulic cylinder 20, with one of the two solenoids 121, 122 controlling extension of the left hydraulic cylinder 20 and the other controlling retraction. Solenoids 123, 124 control hydraulic fluid flow to fluid ports on the right hydraulic cylinder 21, with one of the two solenoids 123, 124 controlling extension of the right hydraulic cylinder 21 and the other controlling retraction. Solenoids 125, 126 control hydraulic fluid flow to fluid ports on the horizontally oriented hydraulic cylinder 16, with one of the two solenoids 124, 125 controlling extension of the horizontally oriented hydraulic cylinder 16 and the other controlling retraction. The hydraulic fluid reservoir 128 and hydraulic valve manifold 120 may be located at any convenient location on the tractor. Preferably, the hydraulic fluid reservoir 128 is the same reservoir that runs other hydraulic functions of the tractor.

The control box 105 may be mounted to the tractor with a quick release bracket 106 at an easily accessible location for the operator, for example next to a seat where the operator sits on the tractor. The quick release bracket 106 may comprise one or more mounting snaps 107 mated with corresponding mounting apertures on the tractor to releasably mount the quick release bracket 106 on the tractor. In addition or instead, the quick release bracket 106 may comprise one or more mounting snaps 108 mated with corresponding mounting apertures on the control box 105 to releasably mount the control box 105 to quick release bracket 106 so that the control box 105 may be quickly removed from the quick release bracket 106 leaving the quick release bracket 106 on the tractor.

The control box 105 may comprise one or more control devices for controlling various aspects of the scraper blade assembly. For example, the control box 105 may comprise an on/off switch 110 (e.g. a toggle, button, etc.) for switching power on and off to the control system 100. Power may be supplied by an electrical system of the tractor (e.g. a tractor battery or alternator) and/or a dedicated power supply 115 in the control box 105. The dedicated power supply 115 may be, for example, a battery, solar panels or a combination thereof. A joystick 111 for controlling tilt functions of the blade 6 and a two-way momentary switch 112 (e.g. a toggle, button, etc.) for controlling angle functions of the blade 6 may also be located on the control box 105. A logic circuit 114 may be used to coordinate functions of the electronic components of the control system 100. If the logic circuit 114 is programmable, the logic circuit may be programmed with instructions to automatically control the control system 100 independently of the operator, including receiving signals from the one or more laser level sensors 130 and automatically adjusting blade tilt and angle based on the signals received and a pre-set grading plan. The joystick 111 may be equipped with an override function so that an operator upon using the joystick 111 can immediately override the automatic control program of the logic circuit 114.

The momentary switch 112 may control extension and retraction of the horizontally oriented hydraulic cylinder 16 and is therefore in electronic communication with the two solenoids 124, 125. The momentary switch 112 may have an extend position in which one of the two solenoids 124, 125 is activated and a retract position in which the other of the two solenoids 124, 125 is activated. The horizontally oriented hydraulic cylinder 16 will continue to extend or retract while the momentary switch 112 is in the extend or retract position, respectively, until the momentary switch 112 is set into a neutral position where neither of the two solenoids 124, 125 is activated.

With specific reference to FIG. 11 and FIG. 12, the joystick 111 may be configured with four micro-switches 131, 132, 133, 134, each micro-switch in electronic communication with a corresponding solenoid 121, 122, 123, 124. An electrical connector 119 (e.g. a 9-pin connector) on the control box 105 permits electrical connection of the micro-switches 131, 132, 133, 134 and the momentary switch 112 through wires in an electrical cable to the solenoids 121, 122, 123, 124, 125, 126 in the hydraulic valve manifold 120, although wireless communication may be used instead of or in addition to wires.

The four micro-switches 131, 132, 133, 134 may be configured around a central column 117 of the joystick 111 to advantageously permit control over both the tilt and lift functions of the blade 6 from a single joystick by permitting simultaneous actuation of more than one of the solenoids 121, 122, 123, 124. As seen in FIG. 11, moving the joystick 111 in one of four diagonal directions actuates only one of the solenoids 121, 122, 123, 124 resulting in tilting the blade 6 to the left (left down or right up) or to the right (right down or left up). Moving the joystick 111 forward or backward each actuates two of the solenoids 121, 122, 123, 124 simultaneously, where moving the joystick 111 forward actuates solenoids 121, 123 resulting in lowering blade 6 through extension of left and right hydraulic cylinders 20, 21, and where moving the joystick 111 backward actuates solenoids 122, 124 resulting in raising blade 6 through retraction of left and right hydraulic cylinders 20, 21.

The configuration of micro-switches 131, 132, 133, 134 to achieve the above function of the joystick 111 is shown in FIG. 12. FIG. 12 shows the underside of the lid of the control box 105 and the positions of the micro-switches 131, 132, 133, 134 around the central column 117 of the joystick 111. The positions of the micro-switches 131, 132, 133, 134 in FIG. 12 are seen as a mirror image through axis C-C as compared to the apparent positions of the micro-switches 131, 132, 133, 134 when viewed through a topside of the control box 105 as in FIG. 11. As seen in FIG. 12, when the central column 117 of the joystick 111 is moved diagonally upward left or right, the central column 117 contacts either button contact 141 on left-down micro-switch 131 or button contact 143 on right-down micro-switch 133. However, moving the joystick 111 forward allows the central column 117 to contact both button contacts 141 and 143 thereby activating both micro-switches 131 and 133, thereby actuating both solenoids 121 and 123 to lower the blade 6 without tilting the blade 6. When the central column 117 of the joystick 111 is moved diagonally downward left or right, the central column 117 contacts either button contact 142 on left-up micro-switch 132 or button contact 144 on right-up micro-switch 134. However, moving the joystick 111 forward allows the central column 117 to contact both button contacts 144 and 144 thereby activating both micro-switches 132 and 134, thereby actuating both solenoids 122 and 124 to raise the blade 6 without tilting the blade 6. Moving the joystick 111 directly left activates both the left-down and left-up micro-switches 131, 132 and moving the joystick 111 directly right activates both the right-down and right-up micro-switches 133, 134, both of which are hydraulically neutral resulting in no movement of the blade 6.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A scraper blade assembly for a vehicle comprising:
a frame mountable to the vehicle, the frame having a socket with a pivotable ball for connection to the vehicle, the pivotable ball configured to permit pivoting movement of the frame about a longitudinal axis, a transverse axis and a vertical axis of the vehicle when the frame is mounted to the vehicle;
a scraper blade for engagement with a soil surface to be graded, the blade attached to a blade portion of the frame;
a left hydraulic cylinder attached to a left side of the blade portion of the frame and to a left vehicle mount configured to be attached to the vehicle;
a right hydraulic cylinder attached to a right side of the blade portion of the frame and to a right vehicle mount configured to be attached to the vehicle, the left and right hydraulic cylinders configured to vertically move the blade portion of the frame and/or tilt the blade portion of the frame relative to horizontal;
a third hydraulic cylinder for angling the blade with respect to the longitudinal axis of the vehicle by pivoting the blade portion about the vertical axis;
electrically actuated valves for controlling extension and retraction of the left and right hydraulic cylinders;
a control system for electrically actuating the valves, the control system comprising a single joystick configured so that movement of the joystick actuates the left hydraulic cylinder, the right hydraulic cylinder or simultaneously both the left and right hydraulic cylinders; and,
a mounting hitch configured to be rigidly mounted to the vehicle and configured to pivotally mount the socket with the pivotable ball to permit the pivoting movement of the frame,
wherein the socket with the pivotable ball for connection to the vehicle is situated behind the blade, the blade is situated forward on the frame and all other structures of the assembly are behind or above the blade, the frame comprises a pair of longitudinal frame members meeting at the socket and connected to the blade portion at transversely spaced-apart locations on the blade portion, the frame is triangular and the socket with a pivotable ball is a single socket with a pivotable ball at an apex of the triangular frame.

2. The assembly according to claim 1, wherein the mounting hitch is configured to be rigidly mounted to a drawbar of the vehicle.

3. The assembly according to claim 1, wherein the pivotable ball comprises a through aperture and the mounting hitch comprises a clevis in which the pivotable ball is mounted by a clevis pin through the through aperture.

4. The assembly according to claim 1, wherein the third hydraulic cylinder is oriented substantially horizontally to the frame, and the third hydraulic cylinder comprises a first end connected to the vehicle and a second end mounted to the blade portion of the frame, wherein extension and retraction of the third hydraulic cylinder pivots the frame about the vertical axis passing through the pivotable ball thereby causing the pivoting of the blade portion about the vertical axis thereby causing the angling of the blade with respect to the longitudinal axis.

5. The assembly according to claim 4, wherein the first end of the third hydraulic cylinder is mounted proximate the longitudinal axis passing through the pivotable ball and the second end of the third hydraulic cylinder is mounted at a location transversely offset from the longitudinal axis passing through the pivotable ball.

6. The assembly according to claim 4, wherein the left and right hydraulic cylinders are oriented upwardly from the blade portion of the frame.

7. The assembly according to claim 6 wherein the left and right vehicle mounts are mounted to a common mounting plate, the mounting plate mounted to the vehicle.

8. The assembly according to claim 7,
wherein the electrically actuated valves comprise first, second, third and fourth electrically actuated valves, the first electrically actuated valve controlling extension of the right hydraulic cylinder, the second electrically actuated valve controlling retraction of the right hydraulic cylinder, the third electrically actuated valve controlling extension of the left hydraulic cylinder and the fourth electrically actuated valve controlling retraction of the left hydraulic cylinder,
and wherein the joystick comprises first, second, third and fourth micro-switches surrounding a central stick, the central stick movable to activate the micro-switches, the first micro-switch actuating the first electrically actuated valve, the second micro-switch actuating the second electrically actuated valve, the third micro-switch actuating the third electrically actuated valve and the fourth micro-switch actuating the fourth electrically actuated valve,
wherein the first and fourth micro-switches are diametrically opposed to each other along a first axis of movement of the central stick and the second and third micro-switches are diametrically opposed to each other along a second axis of movement of the central stick, the first and second axes of movement substantially orthogonal to each other, the central stick movable in the first and second axes,
and wherein the central stick is also movable in an intermediate axis of movement between the first and second axes,
the central stick movable in the first axis to activate the first or fourth micro-switches,
the central stick movable in the second axis to activate the second or third micro-switches, the central stick movable in the intermediate axis to activate both the first and third micro-switches or both the second and fourth micro-switches.

9. The assembly according to claim 8, further comprising electrically actuated valves for controlling extension and retraction of the third hydraulic cylinder connected to a switch for actuating the electrically actuated valves, the switch having a neutral position in which neither extension nor retraction of the third hydraulic cylinder is actuated, an extend position in which the third hydraulic cylinder is actuated to extend and a retract position in which the third hydraulic cylinder is actuated to retract, wherein extension of the hydraulic cylinder angles the blade in one direction with respect to the longitudinal axis and retraction of the hydraulic cylinder angles the blade in an opposite direction with respect to the longitudinal axis.

10. The assembly according to claim 9, further comprising a control box mounted on the vehicle and configured to contain the control system, the control box comprising a release mechanism configured to permit dismounting the control box from the vehicle.

11. The assembly according to claim 10, wherein the control system further comprises an electronic controller configured to fully automate control of the left and right hydraulic cylinders without operator input.

12. The assembly according to claim 11, wherein the control system comprises a slope sensor and wherein he control system is configured to automatically control the left or right hydraulic cylinders.

13. The assembly according to claim 12, wherein the joystick and slope sensor are electronically in series.

14. The assembly according to claim 12, wherein the control system comprises a laser level.

15. A tractor comprising the scraper blade assembly as defined in claim 1 mounted thereon.

16. The tractor according to claim 15, wherein the frame is belly mounted on the tractor between front and rear wheels of the tractor.

17. A skid-steer vehicle comprising the scraper blade assembly as defined in claim 1 mounted thereon.

* * * * *